(12) United States Patent
McCoy et al.

(10) Patent No.: US 9,208,298 B2
(45) Date of Patent: Dec. 8, 2015

(54) PASS THROUGH SERVICE LOGIN TO APPLICATION LOGIN

(75) Inventors: Travis McCoy, San Francisco, CA (US); Roger Tawa, Montreal (CA)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/525,421

(22) Filed: Jun. 18, 2012

(65) Prior Publication Data

US 2013/0340053 A1 Dec. 19, 2013

(51) Int. Cl.
| | |
|---|---|
| *G06F 7/04* | (2006.01) |
| *G06F 21/31* | (2013.01) |
| *G06F 21/41* | (2013.01) |
| *H04L 29/08* | (2006.01) |
| *G06F 17/30* | (2006.01) |
| *G06F 21/12* | (2013.01) |
| *H04L 29/06* | (2006.01) |

(52) U.S. Cl.
CPC ............... *G06F 21/31* (2013.01); *G06F 21/41* (2013.01); *G06F 17/30899* (2013.01); *G06F 21/128* (2013.01); *H04L 63/083* (2013.01); *H04L 63/0807* (2013.01); *H04L 67/306* (2013.01)

(58) Field of Classification Search
CPC ............ H04L 63/0823; H04L 63/083; H04L 63/0876; H04L 63/123; H04L 2463/082; H04L 63/0272; H04L 63/08; H04L 63/0815; H04L 63/0838; G06F 21/41; G06F 17/30876; G06F 21/31; G06F 21/335; G06F 21/35; G06F 21/6218; G06F 2221/2119
USPC .......... 713/155, 171, 180, 186; 726/3, 16, 27; 380/30, 247–250, 258, 259; 902/2–4
See application file for complete search history.

(56) References Cited

U.S. PATENT DOCUMENTS

| | | | |
|---|---|---|---|
| 7,234,158 B1* | 6/2007 | Guo et al. ...................... 726/2 |
| 2004/0111620 A1* | 6/2004 | Saunders et al. .............. 713/182 |
| 2004/0139053 A1* | 7/2004 | Haunschild ..................... 707/1 |
| 2005/0076130 A1 | 4/2005 | Anand et al. |
| 2006/0005237 A1* | 1/2006 | Kobata et al. .................. 726/12 |
| 2007/0061782 A1* | 3/2007 | Schreiner et al. ............. 717/124 |
| 2008/0046369 A1* | 2/2008 | Wood ............................. 705/50 |
| 2008/0046983 A1 | 2/2008 | Lester et al. |
| 2009/0199276 A1 | 8/2009 | Schneider |
| 2009/0313684 A1 | 12/2009 | Shah et al. |
| 2010/0268759 A1* | 10/2010 | Hepper et al. ................ 709/203 |
| 2011/0154212 A1 | 6/2011 | Gharpure et al. |
| 2011/0296504 A1 | 12/2011 | Burch et al. |

(Continued)

FOREIGN PATENT DOCUMENTS

| | | |
|---|---|---|
| EP | 1426847 A2 | 6/2004 |
| WO | 2013192228 A1 | 12/2013 |

OTHER PUBLICATIONS

Gil, "Staring Android Application from Browser URI", When Grass Was Greener, Mar. 15, 2011, 7 pages.
Search Report and Written Opinion for International Application No. PCT/US2013/046414, mailed Nov. 20, 2013, 11 pages.

(Continued)

*Primary Examiner* — Dant Shaifer Harriman
*Assistant Examiner* — Abiy Getachew

(57) ABSTRACT

Pass through service login for an application can include receiving, within a client system, a credential from a Web-based service responsive to a successful authentication of a user of the client system to the Web-based service. The user can be logged into the application executing within the client system using the credential.

26 Claims, 3 Drawing Sheets

(56) References Cited

U.S. PATENT DOCUMENTS

| | | |
|---|---|---|
| 2012/0072714 A1 | 3/2012 | Grandcolas et al. |
| 2012/0117634 A1 | 5/2012 | Halls et al. |
| 2012/0324556 A1 | 12/2012 | Yefimov et al. |
| 2013/0086669 A1 | 4/2013 | Sondhi et al. |
| 2013/0124606 A1 | 5/2013 | Carpenter et al. |

OTHER PUBLICATIONS

International Preliminary Report on Patentability for PCT Patent Application No. PCT/US2013/046414, mailed on Dec. 31, 2014, 8 pages.
Extended European Search Report for EP Application No. 13806284.9, mailed Jul. 3, 2015, 6 pages.

* cited by examiner

PASS THROUGH SERVICE LOGIN TO APPLICATION LOGIN

BACKGROUND

A "browser" generally refers to a computer program that, when executed within a data processing system, retrieves electronic documents, such as Web pages, over a communication network and displays the retrieved electronic documents. Typically, the browser executes within, or as part of, a client system and retrieves information from a server system. Modern browsers can provide users with an interactive experience through which data, e.g., Web pages, can be accessed.

In some cases, a user is permitted to maintain an identity with an application. Having determined an identity for a user through some mechanism of authentication, an application such as a browser can provide the user with a customized user experience. The application can implement a customized environment that is stored in association with the identity.

BRIEF SUMMARY

One or more embodiments disclosed within this specification relate to using a login process for a service to log a user into an application executing within a client system.

An embodiment can include a method. The method can include receiving, within a client system, a credential from a Web-based service responsive to a successful authentication of a user of the client system to the Web-based service. The user can be logged into the application executing within the client system using the credential.

Another embodiment can include a system having a processor. The processor can be configured to initiate executable operations including receiving, within a client system, a credential from a Web-based service responsive to a successful authentication of a user of the client system to the Web-based service. The user can be logged into the application executing within the client system using the credential.

Another embodiment can include a computer program product. The computer program product can include a computer readable storage medium having stored thereon program code that, when executed, configures a processor to perform operations including receiving, within a client system, a credential from a Web-based service responsive to a successful authentication of a user of the client system to the Web-based service. The user can be logged into the application executing within the client system using the credential.

DETAILED DESCRIPTION

While the specification concludes with claims defining features of one or more embodiments that are regarded as novel, it is believed that the embodiment(s) will be better understood from a consideration of the description in conjunction with the drawings. As required, one or more detailed embodiments are disclosed within this specification. It should be appreciated, however, that the embodiment(s) are merely exemplary. Therefore, specific structural and functional details disclosed within this specification are not to be interpreted as limiting, but merely as a basis for the claims and as a representative basis for teaching one skilled in the art to variously employ the embodiment(s) in virtually any appropriately detailed structure. Further, the terms and phrases used within this specification are not intended to be limiting, but rather to provide an understandable description of the embodiments disclosed herein.

One or more embodiments disclosed within this specification relate to using a login process for a service to log a user into an application executing within a client system. In accordance with the inventive arrangements disclosed within this specification, a login process used to authenticate a user to a service can be used to authenticate the user to an application executing within the user's client system. By leveraging the same login process used by the service, the user need not undertake a separate login process that is distinct from the service login process in order to login to the application. Once the user is logged into the application, the application can perform one or more operations with the service on behalf of the user. The operations can be performed using the identity with which the user has been associated within the application via the "shared" login process.

In one aspect, data received from the service responsive to a successful authentication of the user to the service can be used to establish an identity for the user within the application. For example, the application can intercept a credential sent from the service and store the credential for subsequent use. In general, the reception of the credential from a particular service, e.g., one that is considered a trusted service, indicates that the user has been successfully authenticated to that service as an authorized user. As such, the application can consider the user authorized and effectively logs the user into the application by providing the user access to an identity maintained within the application.

Figure 1:
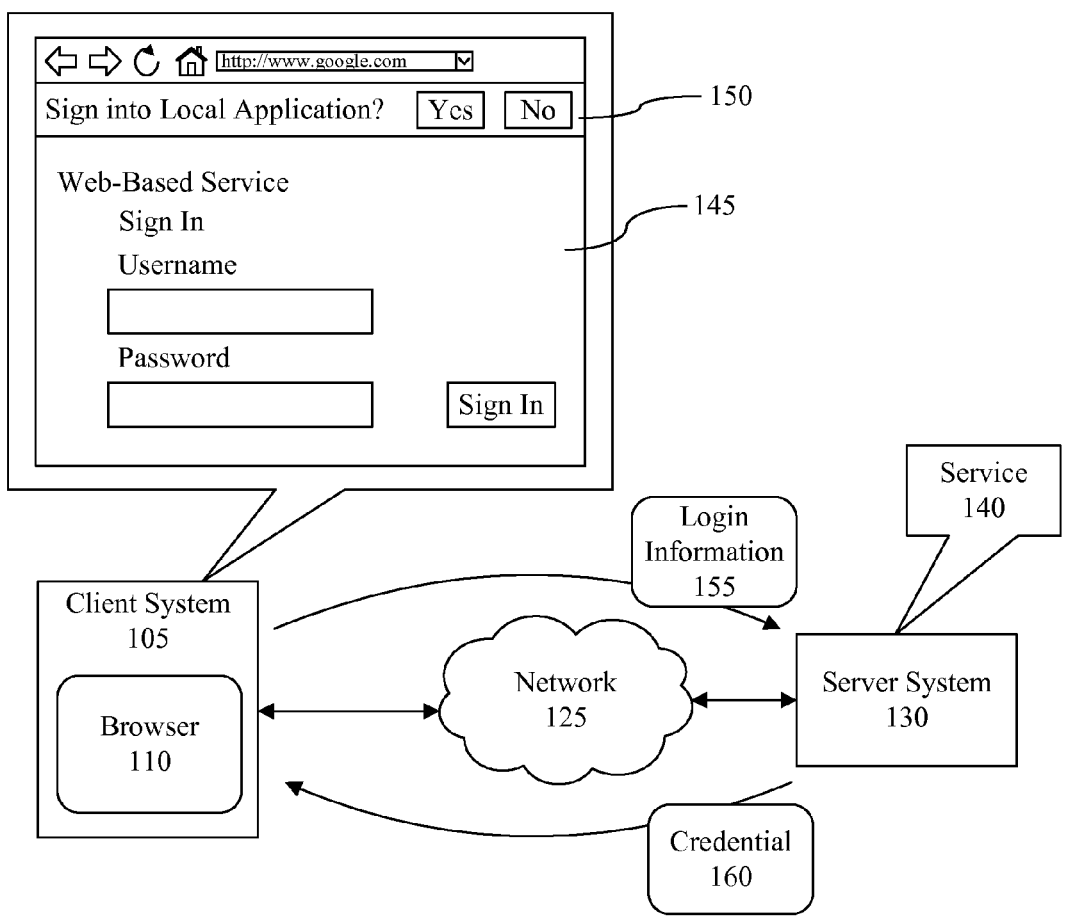
FIG. 1 is a block diagram illustrating a communication system in accordance with an embodiment disclosed within this specification.

FIG. 1 is a block diagram illustrating a communication system 100 in accordance with an embodiment disclosed within this specification. As pictured, communication system 100 can include a client system (client) 105 coupled to a server system (server) 130 via a network 125.

Client 105 is implemented as a data processing system operable to execute program code, e.g., an operating system (not shown) and an application such as a browser 110. Client 105 can be implemented as virtually any data processing system that is capable of executing an application such as browser 110 and that is also capable of coupling to service 140 through network 125 via a wired or wireless connection.

Network 125 can represent any of a variety of communication networks or a combination of two or more communication networks coupled together. For example, network 125 can be implemented as, or include, a Wide Area Network, a local area network, a wireless network, a mobile network, the Internet, or various combinations thereof.

Server 130 is implemented as a single data processing system or as a group of two or more interconnected data processing systems. Server 130 is configured to store information and respond to requests received from client systems, e.g., client 105, over network 125. Server 130 can be configured to provide data stored therein to client 105 over network 125 responsive to the received requests. Accordingly, system 100 generally implements a "client-server" type of architecture.

As shown, client 105 executes browser 110. Browser 110 is implemented as a computer program that, when executed, configures client 105 to perform operations including, but not limited to, requesting data from server 130, retrieving data from server 130, and displaying data received from server 130. For example, client 105, while executing browser 110, can request, receive, and display electronic documents such as Web pages.

Server 130 executes service 140. Service 140 is any of a variety of Web-based services that are accessed by client systems. Accordingly, server 130, executing service 140, allows a user, e.g., a human being, using client 105 to login to service 140 and use one or more functions provided by service 140. Examples of service 140 can include, but are not limited to, electronic mail, photo management and sharing, electronic document generation and editing, calendaring, task management, or the like. Appreciably, one or more services can be linked together and made available to a user if the user is authenticated with the service(s).

Service 140 can maintain one or more user accounts. Each account maintained or stored as part of service 140 can be considered a different identity maintained by service 140. For purposes of discussion, an identity maintained in server 130, e.g., as part of or by service 140, is referred to as a "service account." A service account includes information relating to service 140 such as preferences and content for the service such as documents, electronic mails, tasks, etc., for a specific user and/or for a particular identity of a user in the event the user has more than one service account with a same service.

Browser 110 also can maintain one or more user accounts. Each account maintained or stored as part of browser 110 can be considered a different identity maintained by browser 110. For purposes of discussion, a user identity maintained in client 105, e.g., as part of or by browser 110, is referred to as an "application account." An application account includes information relating to browser 110 such as preferences and settings for browser 110 that, when implemented provide a customized application environment for a specific user and/or for a particular identity of the user in the event the user has more than one application account for browser 110.

As pictured, client 105, while executing browser 110, has navigated to a Web page 145 that is provided by service 140. Accordingly, client 105 is displaying Web page 145. In one aspect, browser 110 can detect an access, or attempted access, to service 140. As shown, Web page 145 is requesting that the user provide a username and a password to login, or "sign in," to service 140. It should be appreciated that while a username and a password is requested in this example, any of a variety of login procedures with lesser or greater security features can be used. As such, the one or more embodiments disclosed within this specification are not intended to be limited by the particular login information that is provided to authenticate a user to a service.

Browser 110, responsive to detecting an access to service 140, can display a notification 150. In this example, notification 150 is implemented as an information bar displayed across a top portion of a window of browser 110 in which Web page 145 is displayed. It should be appreciated that notification 150 can be presented or displayed using any of a variety of known user interface elements and that the use of an information bar is for purposes of illustration only. The one or more embodiments disclosed within this specification are not intended to be limited by the particular user interface element selected to implement notification 150.

Notification 150 queries the user whether he or she would like to sign into the local application executing in client 105, which is browser 110 in this example. More particularly, notification 150 asks the user whether he or she would like to login to browser 110 using the same login process used by service 140. If not, e.g., the user selects "no," the user can continue to login to service 140 in the conventional manner and is not logged into browser 110. If the user decides to login to the local application, e.g., the user selects "yes," then browser 110 leverages the login process implemented by service 140 to log the user into the application. Browser 110 uses authentication information provided from service 140 responsive to successful authentication of the user to log the user into browser 110.

Consider the case in which the user selects "yes" within notification 150. In that case, the user has provided a username and a password within the fields illustrated within Web page 145. Responsive to the user submitting the login information, e.g., the user pressing the enter key or selecting the "sign in" interface element, client 105 sends login information 155 to server 130 and, more particularly, to service 140 executing within server 130. In this example, as noted, login information 155 includes the username and the password provided by the user. In other embodiments, fewer or more items of information, e.g., a certificate or the like, can be included as part of login information 155.

Upon receipt of login information 155, service 140 authenticates the user thereby correlating the user with a service account matching the login information. Accordingly, the user is given access to the identified service account. Responsive to successfully authenticating the user, service 140 sends authentication information referred to as a credential 160 to client 105. Responsive to receiving credential 160, browser 110 logs the user into browser 110. Browser 110 provides the user with access to an application account maintained within browser 110 that is associated with the credential 160 and/or service 140.

In one aspect, credential 160 is a bearer token. A bearer token refers to a digital object that is presented to an entity, e.g., a verifying entity such as service 140, in an authentication transaction. In the case of a bearer token, the bearer token need not be bound to a particular identity. Rather, the mere possession of the bearer token by a system such as client 105 authorizes the client for particular activities. In this case, possession of the bearer token can log the user into service 140 and provide the user, by way of client 105, access to a service account. In another aspect, credential 160 can be bound to an individual or identity to which the credential was issued.

An example of credential 160 can be a digital document such as a cookie or another file. As noted, credential 160 is used in authentication and/or access control and may bind an identity or an attribute to a user or some other property such as a network address. In this example, when service 140 detects credential 160 on client 105 in subsequent transactions, client 105 is presumed to be under the control of, or is recognized as, an authorized user and provided access to the service account associated with credential 160.

In another aspect, browser 110 can store credential 160 locally and persist, e.g., store, credential 160 in a long term storage so that the user, by virtue of having credential 160 stored locally in client 105, continues to be logged in to the application account as well as the service account. While the user is logged into the application account, browser 110 can perform one or more actions on behalf of the user. In one aspect, browser 110 can activate one or more user settings to implement a user-specific application environment. In another aspect, browser 110 can automatically back-up and/or store the application account of the user to service 140. In the case of a browser, the application account can include cookies, usernames and passwords, bookmarks, and the like.

The exemplary embodiments described with reference to FIG. 1 facilitate the automated login of a user to an application executing locally within a client using the same login process and authentication information used by a service. Further aspects of the embodiments will be described with reference to the remaining figures.

Figure 2:
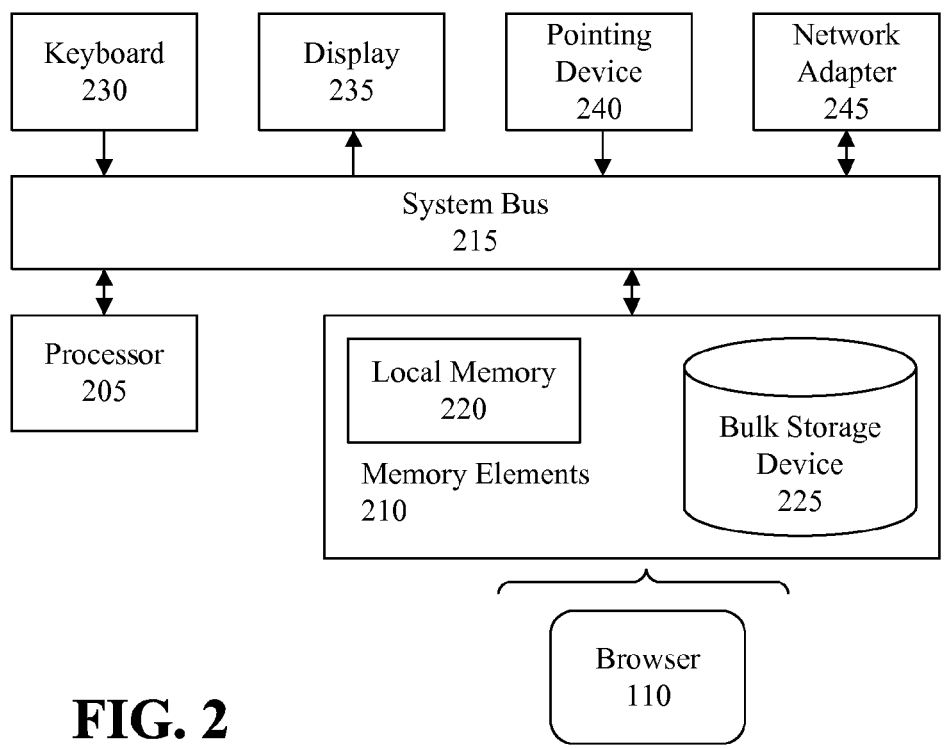
FIG. 2 is a block diagram illustrating an exemplary implementation of a client system shown in FIG. 1 in accordance with another embodiment disclosed within this specification.

FIG. 2 is a block diagram illustrating an exemplary implementation of client 105 of FIG. 1 in accordance with another embodiment disclosed within this specification. Like numbers will be used to refer to the same items throughout this specification. Client 105 can include at least one processor 205 coupled to memory elements 210 through a system bus 215 or other suitable circuitry. As such, client 105 can store program code within memory elements 210. Processor 205 can execute the program code accessed from memory elements 210 via system bus 215.

Memory elements 210 can include one or more physical memory devices such as, for example, local memory 220 and one or more bulk storage devices 225. Local memory 220 refers to random access memory (RAM) or other non-persistent memory device(s) generally used during actual execution of the program code. Bulk storage device(s) 225 can be implemented as a hard disk drive (HDD), a solid state drive (SSD), or another persistent data storage device. Client 105 also can include one or more cache memories (not shown) that provide temporary storage of at least some program code in order to reduce the number of times program code must be retrieved from bulk storage device 225 during execution.

In one aspect, for example, client 105 can be implemented as a computer or communication device that is suitable for storing and/or executing program code. Client 105 can be implemented in the form of any system including a processor and memory that is capable of performing the functions and/or operations described within this specification. Examples of client system 105 can include any of a variety of computing systems such as desktop computers, laptop computers, thin clients, tablet computers, mobile communication devices such as mobile phones, or the like.

Input/output (I/O) devices such as a keyboard 230, a display 235, and a pointing device 240 optionally can be coupled to client 105. The I/O devices can be coupled to client 105 either directly or through intervening I/O controllers. One or more network adapters 245 also can be coupled to client 105 to enable client 105 to become coupled to other systems, computer systems, remote printers, and/or remote storage devices through intervening private or public networks. Modems, cable modems, Ethernet cards, and wireless transceivers are examples of different types of network adapters 245 that can be used with client 105.

As pictured in FIG. 2, memory elements 210 can store browser 110. Browser 110, being implemented in the form of executable program code, can be executed by client 105 and, as such, can be considered part of client 105. In general, browser 110 can be configured to detect an access a service, e.g., a Web-based service. Responsive to detecting the access, browser 110 can query a user whether to log the user into the application using any authentication information that may be received from the service in consequence of a successful authentication of the user to the service.

Figure 3:
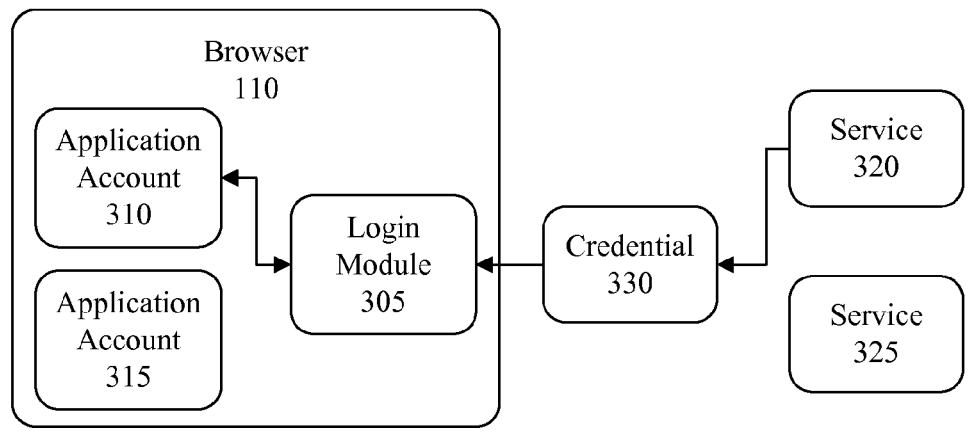
FIG. 3 is a block diagram illustrating an exemplary implementation of a browser in accordance with another embodiment disclosed within this specification.

FIG. 3 is a block diagram illustrating an exemplary implementation of browser 110 in accordance with another embodiment disclosed within this specification. As pictured, browser 110 can include a login module 305. Browser 110 further can include more than one application account. Application account 310 can include or specify information that is different from application account 315.

For purposes of illustration, consider the case in which application account 310 corresponds to a first user, whereas application account 315 corresponds to a second and different user. In another example, application account 310 can be a first identity of a user, while application account 315 is a second and different identity of the same user. For example, application account 310 is a "personal" account whereas application account 315 is a "work" account for browser 110.

In one embodiment, each of application accounts 310 and 315 can be associated with one or more different services, and as such, Web pages provided by such services. For example, each application account can be correlated with one or more Uniform Resource Identifiers (URIs), or portions thereof, for a service. In another example, each application account can be correlated with an element such as a tag or other identifier that is included within a Web page that is identifiable by browser 110 when received and/or displayed. In any case, login module 305 can coordinate and maintain the associations.

In one aspect, browser 110 can store a list of services for which the login process can be used to login a user to browser 110. For example, login module 305 can maintain a list of approved or trusted services. Further, login module 305 can store associations between selected, e.g., approved, services and application accounts. For example, login module 305 can store an association between application account 310 and service 320. Login module 305 further can store an association between application account 315 and service 325.

Consider the case in which a user navigates to a Web page of service 320 and is asked to login to service 320. Browser 110 can detect an access of service 320. In one aspect, detecting access can include login module 305 detecting a request sent to service 320, e.g., using the URI, and identifying service 320 as one in which the login process can be used to login the user into browser 110. For example, the URI or a portion thereof can be matched to a trusted service on the list. In another aspect, detecting access can include login module 305 detecting an identifier within a Web page received from service 320 and identifying service 320 as one in which the login process can be used to login the user into browser 110. For example, the identifier can be matched to a trusted service on the list.

In response to detecting an access to service 320, browser 110 can query the user whether to login to an application account stored therein. In this example, the user has responded in the affirmative to login to an application account. Login module 305 recognizes the association between service 320 and application account 310. Accordingly, responsive to receiving credential 330 from service 320, login module 305 logs the user into application account 310 using credential 330.

FIG. 3 is presented to illustrate an example in which multiple application accounts are maintained within browser 110. In another embodiment, however, login module 305 need not store any associations as described. In that case, for example, login module 305 can present, e.g., display, a list of available application accounts from which the user can choose, e.g., application account 310 and application account 315. Login module 305 can log the user into application account selected by the user using credential 330. In still another embodiment, one of the plurality of application accounts can be designated as a "default" account. In that case, login module 305 can log the user into the default account using credential 330. It should be appreciated that when a single application account is included within browser 110, that account can be selected automatically for purposes of logging the user in using credential 330. It should be appreciated that whether or not associations between particular services and particular application accounts are stored, browser 110 still can store information, e.g., a list, indicating trusted services for which the authentication processes can be used for purpose of logging a user into browser 110.

Figure 4:
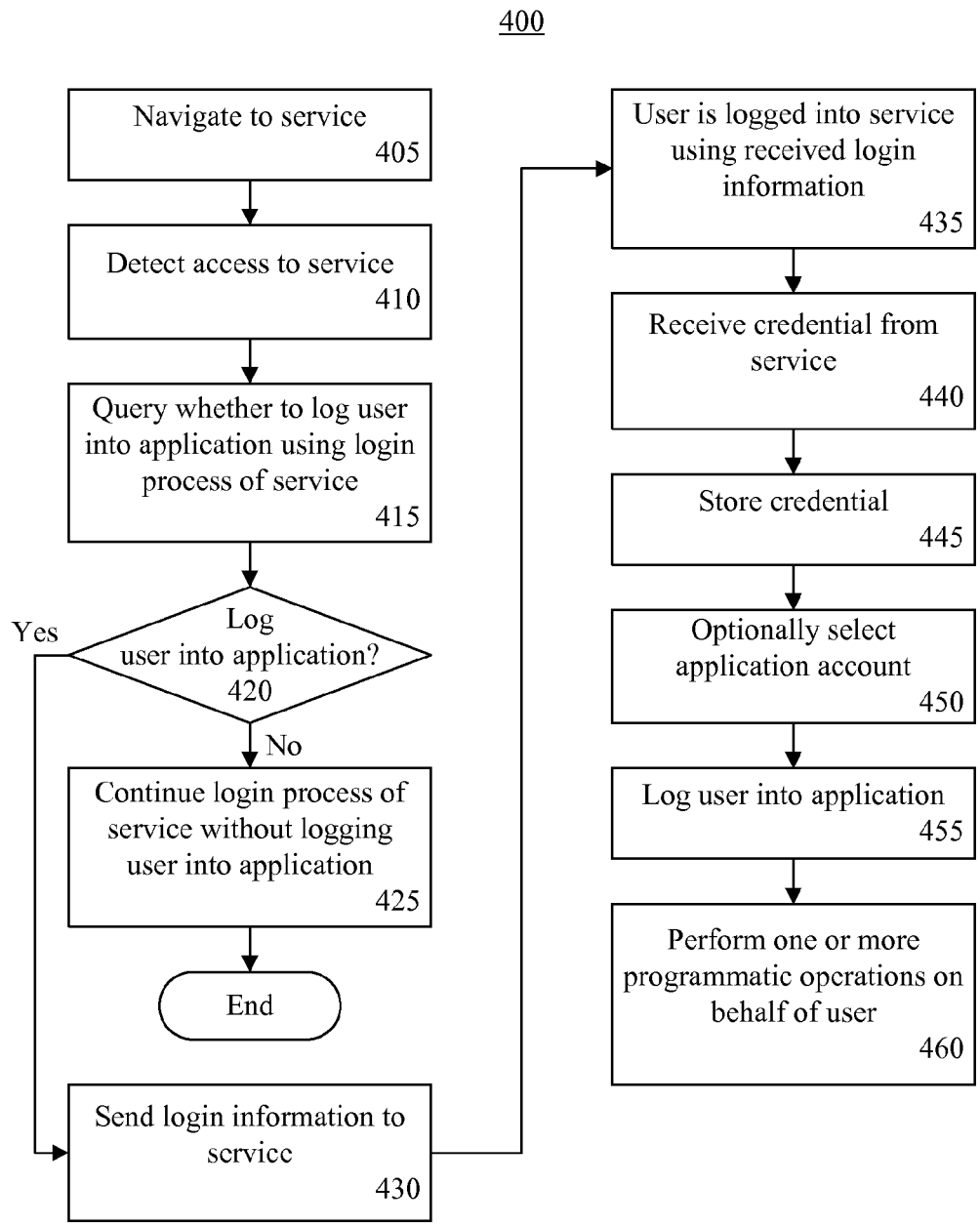
FIG. 4 is a flow chart illustrating a method of logging a user into an application within a client in accordance with another embodiment disclosed within this specification.

FIG. 4 is a flow chart illustrating a method 400 of logging a user into an application within a client in accordance with another embodiment disclosed within this specification. Method 400 can be performed by a system such as client 105 as described with reference to FIG. 1. Accordingly, the method 400 can begin in a state in which the browser is executing with the client.

In block 405, the client can navigate to a service and load a Web page from the service. For example, the client can request a Web page that can be received from the service. In block 410, the client can detect an access to a service for which the authentication process can be used to log the user into an application executing within the client, e.g., the browser. The client can detect an access of the service by the client using any of a variety of the different techniques previously described including variants or equivalents thereof.

In block 415, responsive to detecting access by the client to the service, the client can query the user whether to log the user into the application. In block 420, the client determines whether the user wishes to login to the application based upon a received response. It should be appreciated that a lack of a response can be interpreted by the system as a negative response indicating that the user does not wish to login to the application. For example, providing a username and a password without selecting yes or no to the notification would be construed as a negative response. If the user indicates that he or she would like to login to the application, method 400 can proceed to block 430. If the user indicates that he or she would not like to login to the application, method 400 can continue to block 425. In block 425, the client can continue a login process of the service without logging the user into the application.

In block 430, where the user has indicated a desire to login to the application, the client can send login information to the service. As noted, the client can log the user into the application account using the same login process used to authenticate the user to the service. In block 435, the user can be logged into the service using the user login information. The service, for example, can authenticate the user and provide the user with access to the service account that is associated with the identity of the user as determined from the login information.

In block 440, the client can receive a credential from the service. In block 445, the client can store the received credential. The client can store the credential in a data storage medium within the client or that is accessible by the client. As discussed, in one aspect the client can store the received credential in a long term data storage medium that persists data despite the browser terminating execution, the client system being turned off, restarting, e.g., power cycling, or the like.

In block 450, the client optionally can select a particular application account to which the user is to be given access upon login to the browser. Block 450 can be implemented when multiple application accounts are stored within the application and a particular application account must be selected for logging the user into the application. As noted, a default application account can be selected from a plurality of application accounts, a correlation can be stored between the service and a particular application account, or the user can manually select an application account.

In block 455, the client can log the user into the application, which is a browser in this example. The browser can authenticate the user using the received credential from the service and provide the user access to the application account that is associated with the identity indicated by the credential.

As noted, the reception of a credential from a particular service, e.g., one that is considered a trusted service by the client, indicates that the user has been successfully authenticated to that service as an authorized user. As such, the application, which is a browser in this example, can consider the user authorized and provide the user access to an application account as described. In one aspect, the application account and the service can have same login information. For example, referring to FIG. 1, both the application account into which the user is logged in and the service may have a same username and a same password.

In block 460, the client, e.g., with the application executing therein, can perform one or more operations. The operations can be performed on behalf of the user using the identity of the application account to which the user has been given access within the application.

In illustration, when the application is a browser, in one aspect, the browser can store a copy of the application account, or a portion thereof, with the service. For example, the browser can backup the application account, settings of the application account, or the like, to the service. In another aspect, the browser can synchronize the application account, or a portion thereof, with the service. In another example, the user can be logged into the application and provided access to the application account in subsequent sessions of the application, e.g., any session in which the application is executed after a termination of execution of the application. The browser can continue to perform operations as described until the credential is no longer stored on the client or expires. In one embodiment, when the credential is no longer stored in the client or expires, the user can be logged out of the application.

Another exemplary operation can include activating or invoking one or more settings of the browser specified by the application account to implement a preferred and user-specific application environment. For example, particular cookies, bookmarks, visual themes for the user interface of the application, and the like can be made available to the user when logged into the application as specified by the particular application account to which the user has been given access.

The embodiment(s) disclosed within this specification illustrate various techniques for logging a user into an application using a login process for a service. While a browser has been used for purposes of illustration, it should be appreciated that the one or more embodiments disclosed herein can be implemented with other types of applications. The one or more embodiments can be applied to any type of application that is capable of accessing a service, which includes accessing information from an "online" source or over a network. Further, as different varieties of applications incorporate embedded browsers or browser functionality, the one or more embodiments disclosed herein can be applied to such applications as well.

For example, in the event that the application is not a browser, but is configured to access information over a network, the application can issue a request to a service. A variety of applications such as, for example, financial applications, access financial data from sources over a network. In that case, the URI of the service can be recognized by the application. Alternatively, information received in response to a request can include an element identifiable by the application.

In any case, the application can present a user interface, as opposed to a Web page, for example, through which login information is requested from the user for the service. The user interface can be any of a variety of interface elements into which a user can enter login information. The user interface further can include a notification as described that asks the user whether he or she would also like to login to the application. The process can proceed as described with a credential received from the service being used to log the user into the application.

For purposes of explanation, specific nomenclature is set forth to provide a thorough understanding of the various inventive concepts disclosed herein. The terminology used herein, however, is for the purpose of describing particular embodiments only and is not intended to be limiting. For example, reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The terms "a" and "an," as used herein, are defined as one or more than one. The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

The term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

One or more embodiments can be realized in hardware or a combination of hardware and software. One or more embodiments can be realized in a centralized fashion in one system or in a distributed fashion where different elements are spread across several interconnected systems. Any kind of data processing system or other apparatus adapted for carrying out at least a portion of the methods described herein is suited.

One or more embodiments further can be implemented in the form of a computer program product, which includes all the features enabling the implementation of the methods described herein. The computer program product includes a data storage medium, e.g., a non-transitory computer-usable or computer-readable storage medium, storing program code that, when executed in a system including a processor, causes the system to perform at least a portion of the functions described within this specification. Examples of data storage media can include, but are not limited to, optical media, magnetic media, magneto-optical media, computer memory such as RAM, a bulk storage device, e.g., hard disk, or the like.

Accordingly, the flowchart and block diagrams in the Figures illustrate the architecture, functionality, and operation of possible implementations of systems, methods and computer program products according to various embodiments disclosed herein. In this regard, each block in the flowchart or block diagrams may represent a module, segment, or portion of code, which includes one or more executable instructions for implementing the specified logical function(s). It should also be noted that, in some alternative implementations, the functions noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terms "computer program," "software," "application," "computer-usable program code," "program code," "executable code," variants and/or combinations thereof, in the present context, mean any expression, in any language, code or notation, of a set of instructions intended to cause a system having an information processing capability to perform a particular function either directly or after either or both of the following: a) conversion to another language, code, or notation; b) reproduction in a different material form. For example, program code can include, but is not limited to, a subroutine, a function, a procedure, an object method, an object implementation, an executable application, an applet, a servlet, source code, object code, markup language, an extension, a shared library/dynamic load library and/or other sequence of instructions designed for execution on a computer system.

Thus, throughout this specification, statements utilizing terms such as "processing," "computing," "calculating," "determining," "displaying," or the like, refer to the action and processes of a data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

The corresponding structures, materials, acts, and equivalents of all means or step plus function elements in the claims below are intended to include any structure, material, or act for performing the function in combination with other claimed elements as specifically claimed.

One or more embodiments disclosed within this specification can be embodied in other forms without departing from the spirit or essential attributes thereof. Accordingly, reference should be made to the following claims, rather than to the foregoing specification, as indicating the scope of the one or more embodiments.

What is claimed is:

1. A method of logging a user into a browser executing within a client system, the method comprising:
providing a username and password from a user of the client system to a Web-based service;
authenticating the user of the client system to the Web-based service using the username and password;
receiving, within the client system, a credential from a Web-based service responsive to the authentication of the user of the client system to the Web-based service, wherein the credential is one of a bearer token or a cookie;
obtaining, by the browser, one or more browser settings corresponding with the credential; and
logging the user into the browser executing within the client system using the credential that is received from the Web-based service, wherein logging the user into the browser includes activating the one or more browser settings to implement a user-specific browser environment customized for the user.

2. The method of claim 1, further comprising:
detecting an access of the Web-based service; and
responsive to detecting the access, querying a user whether to log the user into the browser using the credential; and
in response to the query and before logging the user into the browser, receiving confirmation from the user to log the user into the browser.

3. The method of claim 1, further comprising:
storing the credential in a long term storage of the client system.

4. The method of claim 1, wherein the credential is associated with the Web-based service and a user-specific application account for the browser.

5. The method of claim 4, wherein the application account is selected from a plurality of application accounts maintained within the browser.

6. The method of claim 4, further comprising:
responsive to logging the user into the browser, implementing at least one setting of the browser specified by the application account.

7. The method of claim 1, wherein the browser is configured to navigate to the Web-based service.

8. The method of claim 1, further comprising:
responsive to logging the user into the browser, performing an operation on behalf of the user with the Web-based service.

9. The method of claim 1, wherein activating the one or more browser settings to implement a user-specific browser environment customized to the user includes providing user-specific bookmarks within the browser to the user.

10. The method of claim 1, wherein activating the one or more browser settings to implement a user-specific browser environment customized to the user includes providing a user-specific visual theme within the browser to the user.

11. A client system for logging a user into a browser executing within a client system, the system comprising:
a processor configured to invoke executable operations comprising:
providing a username and password from a user of the client system to a Web-based service;
authenticating the user of the client system to the Web-based service using the username and password;
receiving, within the client system, a credential from the Web-based service responsive to the authentication of the user of the client system to the Web-based service, wherein the credential is one of a bearer token or a cookie;
obtaining, by the browser, one or more browser settings corresponding with the credential; and
logging the user into the browser executing within the client system using the credential that is received from the Web-based service, wherein logging the user into the browser includes activating the one or more browser settings to implement a user-specific browser environment customized for the user.

12. The system of claim 11, wherein the processor is further configured to invoke executable operations comprising:
detecting an access of the Web-based service;
responsive to detecting the access, querying a user whether to log the user into the browser using the credential; and
in response to the query and before logging the user into the browser, receiving confirmation from the user to log the user into the browser.

13. The system of claim 11, wherein the processor is further configured to invoke an executable operation comprising:
storing the credential in a long term storage of the client system.

14. The system of claim 11, wherein the credential is associated with the Web-based service and a user-specific application account for the browser.

15. The system of claim 14, wherein the application account is selected from a plurality of application accounts maintained within the browser.

16. The system of claim 14, wherein the processor is further configured to invoke an executable operation comprising:
responsive to logging the user into the browser, implementing at least one setting of the browser specified by the application account.

17. The system of claim 11, wherein the browser is configured to navigate to the Web-based service.

18. The system of claim 11, wherein the processor is further configured to invoke an executable operation comprising:
responsive to logging the user into the browser, performing an operation on behalf of the user with the Web-based service.

19. A computer program product for accessing data, the computer program product comprising:
a non-transitory computer readable storage medium having stored thereon program code that, when executed, configures a processor to perform executable operations comprising:
providing a username and password from a user of a client system to a Web-based service;
authenticating the user to the Web-based service using the username and password;
receiving, at a browser running within the client system, a credential from the Web-based service responsive to the authentication of the user of the client system to the Web-based service, wherein the credential is one of a bearer token or a cookie;
obtaining one or more browser settings corresponding with the credential; and
logging the user into the browser executing within the client system using the credential that is received from the Web-based service, wherein logging the user into the browser includes activating the one or more browser settings to implement a user-specific browser environment customized for the user.

20. The computer program product of claim 19, wherein the non-transitory computer readable storage medium stores further program code that, when executed, configures the processor to perform executable operations comprising:
   detecting an access of the Web-based service;
   responsive to detecting the access, querying a user whether to log the user into the browser using the credential; and
   in response to the query and before logging the user into the browser, receiving confirmation from the user to log the user into the browser.

21. The computer program product of claim 19, wherein the non-transitory computer readable storage medium stores further program code that, when executed, configures the processor to perform an executable operation comprising:
   storing the credential in a long term storage of the client system.

22. The computer program product of claim 10, wherein the credential is associated with the Web-based service and a user-specific application account for the browser.

23. The computer program product of claim 22, wherein the application account is selected from a plurality of application accounts maintained within the browser.

24. The computer program product of claim 22, wherein the non-transitory computer readable storage medium stores further program code that, when executed, configures the processor to perform an executable operation comprising:
   responsive to logging the user into the browser, implementing at least one setting of the browser specified by the application account.

25. The computer program product of claim 19, wherein the browser is configured to navigate to the Web-based service.

26. The computer program product of claim 19, wherein the non-transitory computer readable storage medium stores further program code that, when executed, configures the processor to perform an executable operation comprising:
   responsive to logging the user into the browser, performing an operation on behalf of the user with the Web-based service.

\* \* \* \* \*